May 10, 1927.
E. A. DAHLQUIST
FISHING LURE
Filed Oct. 30, 1926
1,627,637
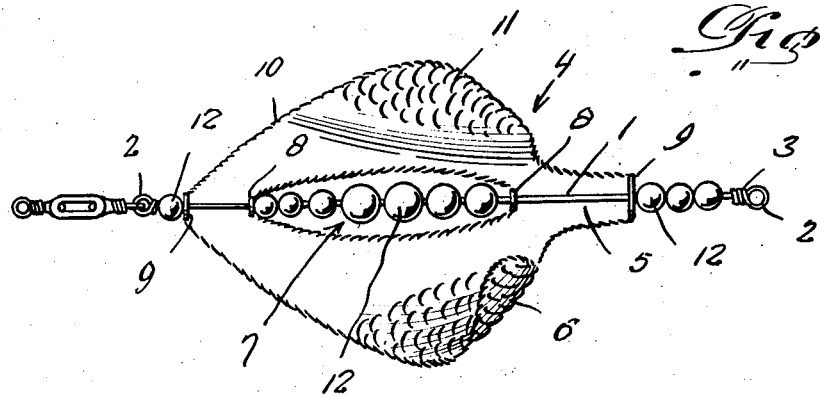
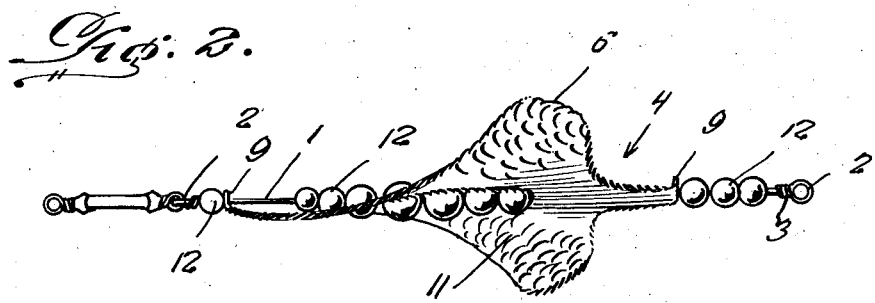
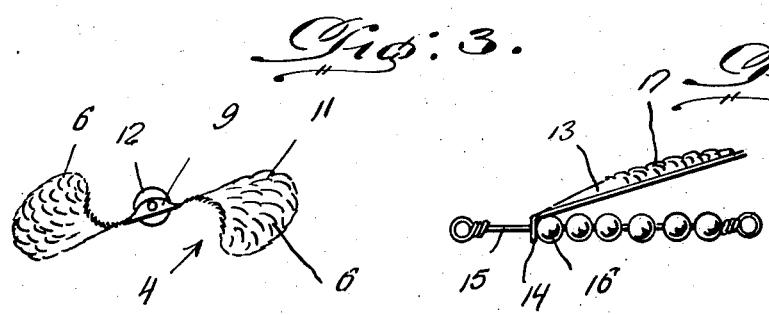
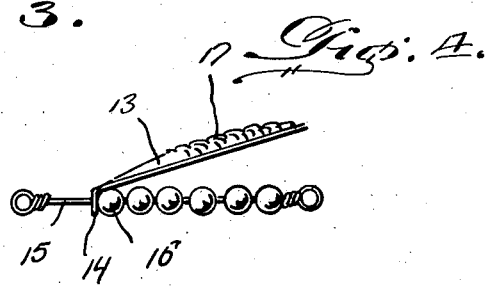
Inventor
E. A. Dahlquist,
By Clarence A. O'Brien
Attorney Patented May 10, 1927.

1,627,637

UNITED STATES PATENT OFFICE.

ERNEST A. DAHLQUIST, OF LONG BEACH, CALIFORNIA.

FISHING LURE.

Application filed October 30, 1926. Serial No. 145,284.

This invention relates to an improved product of manufacture commonly known as a fishing lure, the same having more particular reference to a contrivance which is used in association with a fishing line highly advantageous for use in clear water fishing particularly for catching trout.

As is well known, contrivances of this class include one or more spinners adapted to lure and entice the fish to the vicinity of the line, whereby to permit the catch to be landed in a customary manner.

The present invention embodies several mechanical features of construction, one of which is the particular design of a spinner which is of arrow-head formation to facilitate gliding through the water and to insure rapid and smooth spinning.

A further feature is the presence on the spinner of serrations and indentations simulating fish-scales. An equally important feature is the carrier wire for the spinner upon which the latter is rotatably mounted by bearings such as permit the spinner to rotate in either of two directions to promote rotation and to permit safe landing of the catch by reason of this rotation in opposite directions.

A still further feature and advantage is derived from the use of beads mounted upon the carrier wire and associated with the spinner in such a way as to additionally function as thrust bearings for the spinner.

Other features and advantages of the invention will become apparent from the following description and drawing.

Figure 1 is an elevation of one embodiment of the device embodying the features of this invention, Fig. 2 is another elevation thereof taken at right angles to that shown in Fig. 1, Fig. 3 is an end elevation thereof, Fig. 4 is a side elevation of another embodiment of the device, Fig. 5 is a similar view of the second embodiment taken at right angles to that shown in Fig. 4.

In the drawings two different embodiments of spinners are shown and attention is first to be confined to Figs. 1 to 3, inclusive. As represented here, the reference character 1 indicates a straight carrier wire bent at its opposite ends to provide coupling eyes 2, the wire being twisted as at 3 to insure proper maintenance of the eye. The spinner or lure is generally designated by the reference character 4. As before stated this is of general arrow-head shaped construction, the same including a reduced tail 5. This spinner is constructed of a reliable thin and pliable sheet of metal and certain marginal portions of the same represented by the reference character 6 constitute wings and it will be noted that the wings are curled to the approximate degree shown. Moreover one wing is bent in a direction opposite that of the other to facilitate free rotation while gliding through water. At its center, the body is provided with an elongated elliptical slot 7. At the ends of the slot and also at the ends of the body are right angularly disposed apertured ears 8 and 9 disposed in longitudinal alinement and constituting bearings. The wire 1 passes through these ears, whereby to rotatably support the spinner. The marginal portions of the slot 7 and also the body 4 are serrated as at 10. Then, too, the wings in particular are formed with indentations 11 representing fish scales. In this connection it might be stated that the wings are of one color while the body portion is of another color. To be more explicit, the body portion is preferably coated with brass, while the wings, including the scales, are polished with silver, thus providing a contrast and lending attractiveness to the spinner. It is believed that such a spinner is highly characteristic due to the presence of this contrasting of dull and glittering coatings respectively, thus providing a more efficient lure.

As before stated a plurality of common beads 12 are associated with the spinner and the wire rod 1, the beads being mounted for rotation being of a flashy color, such as, for example, red and being arranged in a manner to function not only as attracting means but as thrust bearings. In connection with the beads it will be noted that some of them are confined in the slot 7 while others are interposed between the bearings 9 and the end eye 2. Consequently, free spinning is assured.

Directing attention now to Figs. 4 and 5, it will be seen that the reference character 13 designates a spoon having a laterally directed bearing 14 rotatably mounted on the supporting wire 15. Here again, thrust bearing beads 16 are provided while the body portion of the spoon is provided with indentations 17 forming the scale simulation.

Moreover, the aforesaid contrasting brass and silver is present in this embodiment to provide the glittering contrast.

A careful consideration of the description in connection with the drawings will unquestionably serve to permit a clear comprehension of the invention to be had, particularly to those skilled in the art to which the invention appertains. For this reason, a more detailed description is believed unnecessary.

Minor changes coming within the field of invention claimed may be resorted to if desired.

I claim:—

A contrivance of the class described comprising a carrier wire having its ends bent to form eyes, a spinner body having apertured ears at its ends and provided intermediate its ends with a slot and ears projecting from the body at the ends of the slot and having apertures in alinement with the first mentioned ears, said wire extending through the apertures of said ears, bearings on said wire between the second mentioned ears, and bearings between each first mentioned ear and the adjacent eye.

In testimony whereof I affix my signature.

ERNEST A. DAHLQUIST.